United States Patent
Suleiman et al.

(10) Patent No.: US 12,215,637 B2
(45) Date of Patent: Feb. 4, 2025

(54) LIQUID FUEL SYSTEM FOR A TURBOMACHINE

(71) Applicant: General Electric Company, Schenectady, NY (US)

(72) Inventors: Baha Suleiman, Dammam (SA); Hatem M. Selim, Dammam (SA); Majed Sammak, Dammam (SA); Alaaeldin Elsaeed Dawood, Dammam (SA); Abdurrahman Abdallah Khalidi, Dubai (AE)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/943,506

(22) Filed: Sep. 13, 2022

(65) Prior Publication Data

US 2024/0084743 A1 Mar. 14, 2024

(51) Int. Cl.
*F02C 9/40* (2006.01)
*F02C 3/30* (2006.01)
*F02C 7/224* (2006.01)

(52) U.S. Cl.
CPC .......... *F02C 9/40* (2013.01); *F02C 3/30* (2013.01); *F02C 7/224* (2013.01); *F05D 2260/213* (2013.01)

(58) Field of Classification Search
CPC .... F02C 9/40; F02C 3/30; F02C 7/224; F05D 2260/213
See application file for complete search history.

(56) References Cited

U.S. PATENT DOCUMENTS

| 5,175,994 A * | 1/1993 | Fox .................. F23K 5/005 60/39.59 |
| 5,457,953 A | 10/1995 | Etheridge |
| 10,443,855 B2 | 10/2019 | Barve et al. |

(Continued)

FOREIGN PATENT DOCUMENTS

| EP | 2622191 A1 | 8/2013 |
| JP | S6226366 A | 2/1987 |
| JP | H09177568 A | 7/1997 |

OTHER PUBLICATIONS

International Search Report Corresponding to Application No. PCT/US2023/073746 on Jan. 4, 2024.

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

Liquid fuel systems and methods are provided. A liquid fuel system includes a mixing unit and a plurality of liquid fuel supply systems. Each liquid fuel supply system is fluidly coupled to the mixing unit. The liquid fuel system further includes a controller communicatively coupled to the mixing unit and the plurality of liquid fuel supply systems. The controller includes memory and one or more processors. The memory stores instructions that when executed by the one or more processors cause the liquid fuel system to perform operations including providing one or more liquid fuels from the plurality of liquid fuel supply systems to the mixing unit. The operations further include mixing, with the mixing unit, the one or more liquid fuels to create a liquid fuel mixture. The operations further include providing the liquid fuel mixture to a combustion section of a turbomachine.

17 Claims, 4 Drawing Sheets

(56) References Cited

U.S. PATENT DOCUMENTS

| | | | |
|---|---|---|---|
| 11,530,652 B2* | 12/2022 | Madden | F02C 3/30 |
| 11,591,973 B1* | 2/2023 | Swann | F02C 3/20 |
| 11,598,266 B2* | 3/2023 | Aguilar | F02C 7/2365 |
| 2013/0186059 A1 | 7/2013 | Epstein et al. | |
| 2014/0026838 A1 | 1/2014 | Agosta | |
| 2016/0084160 A1 | 3/2016 | Zhang et al. | |
| 2016/0273449 A1* | 9/2016 | DiCintio | F23D 11/16 |
| 2017/0003032 A1 | 1/2017 | Jorgensen et al. | |
| 2017/0363015 A1* | 12/2017 | Minto | F23N 5/242 |
| 2018/0363552 A1* | 12/2018 | Zhang | F02C 3/24 |
| 2022/0193629 A1* | 6/2022 | Kambara | F02D 19/081 |
| 2022/0389876 A1 | 12/2022 | Castillo et al. | |

\* cited by examiner

LIQUID FUEL SYSTEM FOR A TURBOMACHINE

FIELD

The present disclosure relates generally to a system and method of supplying fuel to a gas turbine system. Particularly, the present disclosure relates to a system and method of mixing and supplying a liquid fuel mixture to a gas turbine system.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected to a generator to produce electricity. The combustion gases then exit the gas turbine via the exhaust section.

Some traditional gas turbine engines are equipped with dual fuel supply systems (e.g., a liquid fuel supply system and a gaseous fuel supply system). The liquid fuel supply system may include multiple different liquid fuel supplies coupled to a fuel selection unit. The fuel selection unit may be a three-way valve that is configured to output a singular liquid fuel of the multiple different liquid fuels to the combustion section for burning. However, traditional liquid fuel selection systems lack fuel flexibility because they only allow for one liquid fuel to be supplied to the combustion section at a time.

Accordingly, an improved system and method of supplying liquid fuel(s) to a gas turbine would be advantageous. Particularly, an improved system and method of supplying liquid fuel(s) to a gas turbine that increases the operational flexibility of the gas turbine is desired and would be appreciated in the art.

BRIEF DESCRIPTION

Aspects and advantages of the liquid fuel systems and methods in accordance with the present disclosure will be set forth in part in the following description, or may be obvious from the description, or may be learned through practice of the technology.

In accordance with one embodiment, a liquid fuel system for a turbomachine is provided. The liquid fuel system includes a mixing unit and a plurality of liquid fuel supply systems. Each liquid fuel supply system is fluidly coupled to the mixing unit. The liquid fuel system further includes a controller communicatively coupled to the mixing unit and the plurality of liquid fuel supply systems. The controller includes memory and one or more processors. The memory stores instructions that when executed by the one or more processors cause the liquid fuel system to perform operations including providing two or more liquid fuels from the plurality of liquid fuel supply systems to the mixing unit. The operations further include mixing, with the mixing unit, the two or more liquid fuels to create a liquid fuel mixture. The operations further include providing the liquid fuel mixture to a combustion section of the turbomachine.

In accordance with another embodiment, a liquid fuel system for a turbomachine is provided. The liquid fuel system includes a mixing unit. The liquid fuel system further includes a fuel selection unit disposed upstream of the mixing unit and a plurality of liquid fuel supply systems. Each liquid fuel supply system is fluidly coupled to fuel selection unit. The liquid fuel system further includes an aqueous ammonia supply system fluidly coupled to the mixing unit. The liquid fuel system further includes a controller communicatively coupled to the fuel selection unit, the mixing unit, and the plurality of liquid fuel supply systems. The controller includes memory and one or more processors. The memory stores instructions that when executed by the one or more processors cause the liquid fuel system to perform operations including providing two or more liquid fuels from the plurality of liquid fuel supply systems to the fuel selection unit. The operations further include selecting, within the fuel selection unit, a liquid fuel from the two or more liquid fuels; and providing the selected liquid fuel to the mixing unit. The operations further include providing aqueous ammonia from the aqueous ammonia supply system to the mixing unit. The operations further include mixing, with the mixing unit, the selected liquid fuel and the aqueous ammonia to create the liquid fuel mixture. The operations further include providing the liquid fuel mixture to a combustion section of the turbomachine.

In accordance with another embodiment, a method of supplying a liquid fuel mixture to a combustion section of a turbomachine is provided. The method includes providing two or more liquid fuels from a plurality of liquid fuel supply systems to a mixing unit. The method further includes mixing, with the mixing unit, the two or more liquid fuels to create the liquid fuel mixture. The method further includes providing the liquid fuel mixture to the combustion section of the turbomachine.

These and other features, aspects, and advantages of the present liquid fuel systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present liquid fuel systems and methods, including the best mode of making and using the present systems and methods, directed to one of ordinary skill in the art, is set forth in the specification, which makes reference to the appended figures, in which.

DETAILED DESCRIPTION

Figure 1:
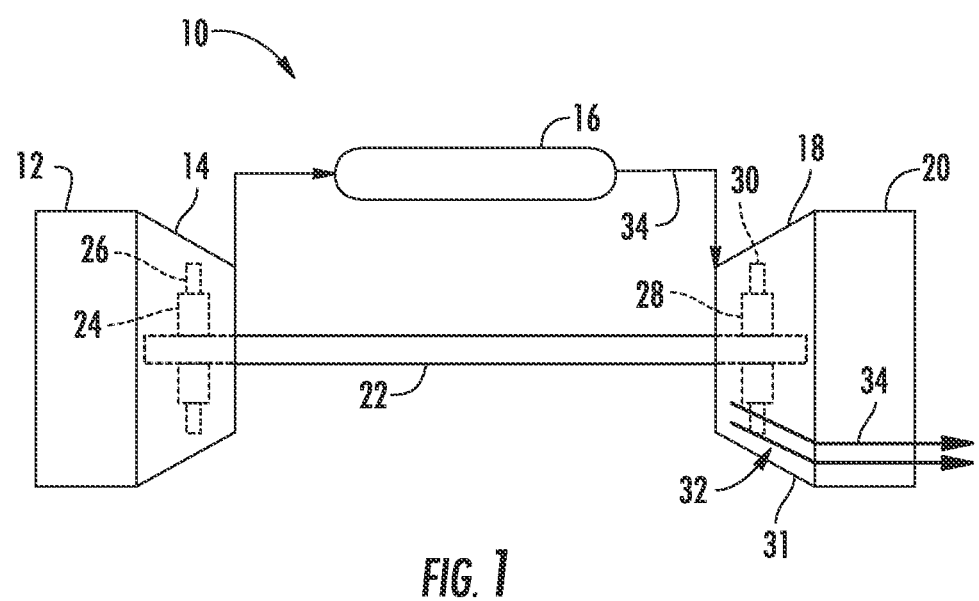
FIG. 1 is a schematic illustration of a turbomachine in accordance with embodiments of the present disclosure.

Reference now will be made in detail to embodiments of the present liquid fuel systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as fall within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows.

The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within five degrees greater or less than the stated angle or direction. For example, "generally vertical" includes directions within five degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "and/or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations may be combined and interchanged. Such ranges are identified and include all the sub-ranges contained therein unless context or language indicates otherwise. For example, all ranges disclosed herein are inclusive of the endpoints, and the endpoints are independently combinable with each other unless otherwise specified.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial and/or land-based gas turbine unless otherwise specified in the claims. For example, the systems as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustion section 16 disposed downstream of the compressor section 14, a turbine section 18 disposed downstream of the combustion section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustion section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
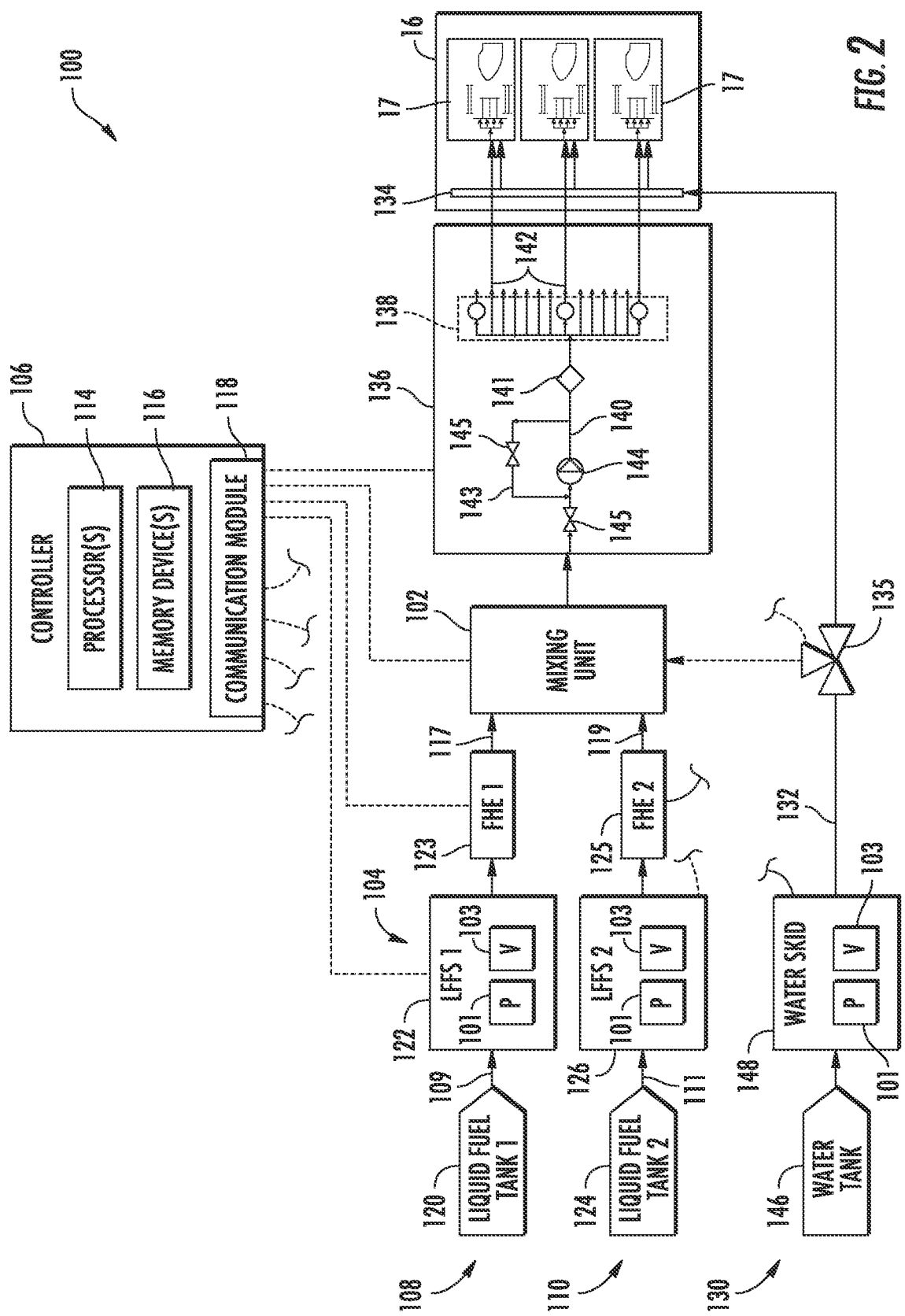
FIG. 2 illustrates a liquid fuel system for a turbomachine in accordance with embodiments of the present disclosure.
Figure 3:
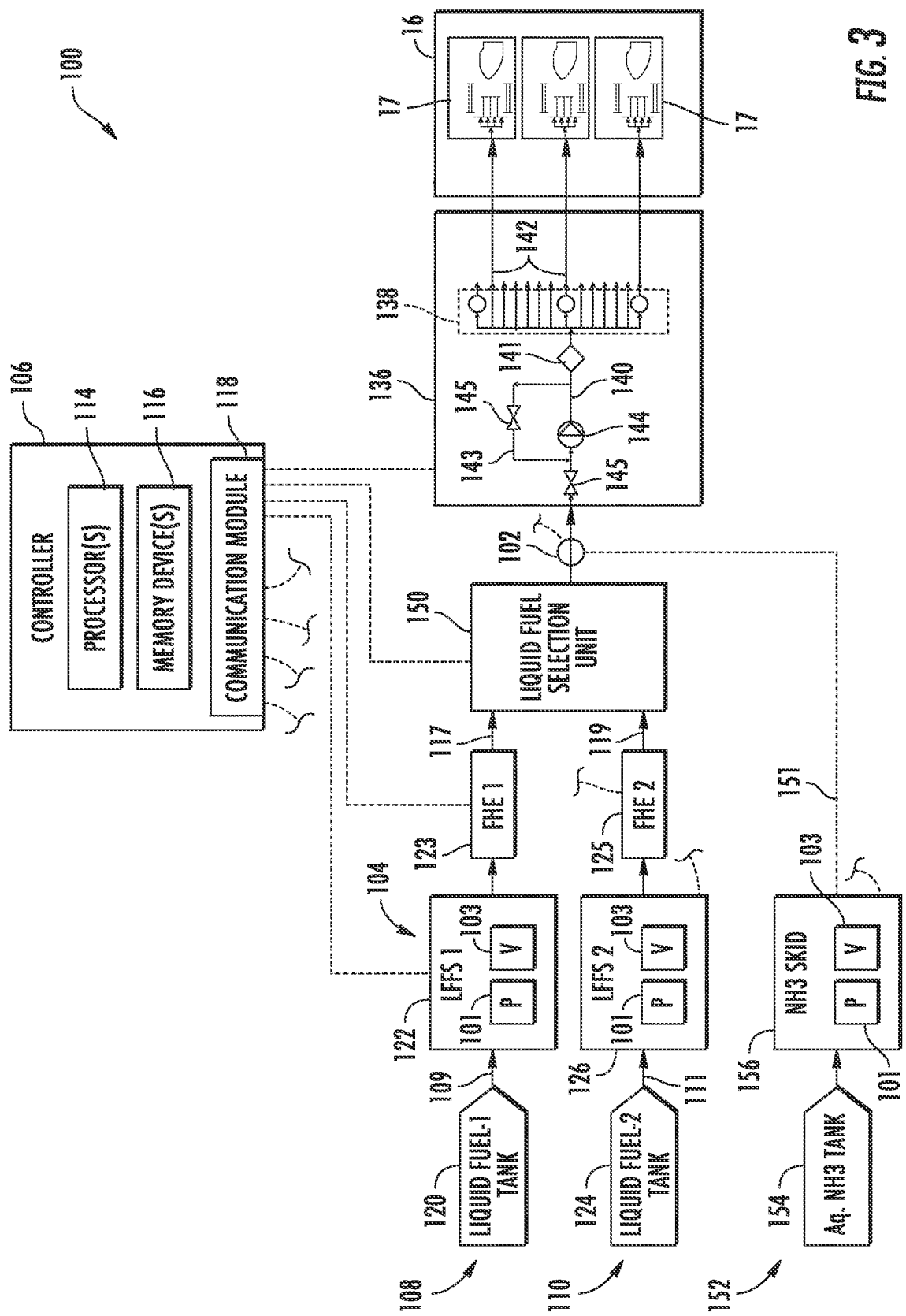
FIG. 3 illustrates a liquid fuel system for a turbomachine in accordance with embodiments of the present disclosure.

Referring now to FIGS. 2 and 3, a liquid fuel system 100 for a turbomachine (such as the gas turbine 10 described above with reference to FIG. 1) is illustrated in accordance with various embodiments of the present disclosure. As shown, the liquid fuel system 100 may include a mixing unit or device 102, a plurality of liquid fuel supply systems 104 each in fluid communication with the mixing unit 102, and a controller 106. For example, each of the liquid fuel supply systems 104 may include an inlet line, a liquid fuel tank (such as a storage tank, container, or otherwise a source of liquid fuel), a liquid fuel forwarding skid, and a fuel heat exchanger. In exemplary embodiments, the liquid fuel system 100 may be configured to provide one or more liquid fuels (or two or more in some embodiments) from the plurality of liquid fuel supply systems 104 to the mixing unit 102 (e.g., via the inlet lines 117, 119). In some embodiments, the liquid fuel system 100 may be further configured to mix (and/or emulsify), with the mixing unit 102, two or more liquid fuels to create a liquid fuel mixture. Further, in various embodiments, the liquid fuel system 100 may be configured to provide the liquid fuel mixture to the combustion section 16 (e.g., via the accessory system 136).

As shown in FIGS. 2 and 3, the plurality of liquid fuel supply systems 104 in the liquid fuel system 100 may include a first liquid fuel supply system 108 and a second liquid fuel supply system 110. The first liquid fuel supply system 108 may include a first liquid fuel tank 120 supplying a first liquid fuel 109, a first liquid fuel forwarding skid 122 disposed in fluid communication with the first liquid fuel tank 120 along a first inlet line 117, and a first fuel heat exchanger 123 disposed in thermal communication on the first inlet line 117. The first inlet line 117 fluidly couples the first liquid fuel tank 120 to the mixing unit 102 (as in FIG. 2) or to a liquid fuel selection unit 150 (as in FIG. 3). As shown, the first liquid fuel tank 120 may supply the first inlet line 117 with a flow of the first liquid fuel 109, which may then enter the first liquid fuel forwarding skid 122, where the fuel 109 may be purified, heated, filtered, and/or pressurized. Subsequently, the flow of the first liquid fuel 109 may travel through the first fuel heat exchanger 123, where it may be heated prior to entrance into the mixing unit 102. In this arrangement, the first liquid fuel forwarding skid 122 may be disposed upstream of the first fuel heat exchanger 123 with respect to the flow of fuel through the first inlet line 117.

Similarly, the second liquid fuel supply system 110 may include a second inlet line 119, a second liquid fuel tank 124 fluidly coupled to the second inlet line 119, a second liquid fuel forwarding skid 126 disposed in fluid communication on the second inlet line 119, and a second fuel heat exchanger 125 disposed in thermal communication on the second inlet line 119. As shown, the second liquid fuel tank 124 may supply the second inlet line 119 with a flow of a second liquid fuel 111, which may then enter the second liquid fuel forwarding skid 126, where the fuel 111 may be purified, heated, filtered, and/or pressurized. Subsequently, the flow of the second liquid fuel 111 may travel through the second fuel heat exchanger 125, where it may be heated prior to entrance into the mixing unit 102. In this arrangement, the second fuel forwarding skid 126 may be disposed upstream of the second fuel heat exchanger 125 with respect to the flow of fuel through the second inlet line 119.

In many embodiments, the first and second liquid fuel forwarding skids 122, 126 may each include one or more manifolds, pumps, fluid conduits, valves, control valves, purifying filters, or other components. By way of example, the first and the second liquid fuel forwarding skids 122, 126 may each include one or more pumps 101 and one or more valves 103. Each of the one or more pumps 101 may be configured to selectively switch between an operational mode (where the pump 101 is moving fluid) and a non-operational mode (where the pump 101 is not moving fluid). The one or more valves 103 may be actuated between an open position (where fluid is permitted to pass therethrough) and a closed position (where fluid is blocked or otherwise prevented from passing therethrough). The controller 106 may be in operable communication with the first and the second liquid fuel forwarding skids 122, 126, such that the controller is able to operate the one or more pumps 101 and to open/close the one or more valves 103 (e.g., by sending control signals to such components). In this way, the controller 106 may selectively provide the first liquid fuel 109 from the first liquid fuel supply system 108 to the mixing unit 102 and/or selectively provide the second liquid fuel 111 from the second liquid fuel supply system 110 to the mixing unit 102.

In exemplary embodiments, each liquid fuel supply system 108, 110 of the plurality of liquid fuel supply systems 104 may provide a different liquid fuel to the mixing unit 102. In such embodiments, the two or more liquid fuels may include the first liquid fuel 109 from a first liquid fuel supply system 108 of the plurality of liquid fuel supply systems 104 and the second liquid fuel 111 from a second liquid fuel supply system 110 of the plurality of liquid fuel supply systems 104. The first liquid fuel 109 and the second liquid fuel 111 may be different liquid fuels. For example, the first liquid fuel 109 may be one of a light diesel oil, a heavy fuel oil, a crude oil, liquefied natural gas (LNG), or an aqueous ammonia. The second liquid fuel 111 may be another (or a different) of light diesel oil, heavy fuel oil, crude oil, liquefied natural gas (LNG), or aqueous ammonia. Aqueous ammonia (also known as ammonia water, ammonia solution, aqua ammonia, ammonium hydroxide, or ammoniacal liquor) is a solution of ammonia in water. It can be denoted by the symbols $NH_3(aq)$.

Mixing multiple different fuels may advantageously increase fuel flexibility of the combustion section 16, thereby allowing for increased operational flexibility of the turbomachine. Additionally, mixing multiple different fuels allows for more environmentally friendly fuels to be burned in combination with highly efficient fuels.

While FIGS. 2 and 3 illustrate a liquid fuel system 100 having two liquid fuel supply systems each in fluid communication with the mixing unit 102, it should be appreciated that the liquid fuel system 100 may include any number of liquid fuel supply systems, and the present disclosure should not be limited to any particular number of fuel supply systems unless specifically recited in the claims.

As shown in FIGS. 2 and 3, the liquid fuel system 100 may further include an accessory system 136. The accessory system 136 may include a flow divider 138 that divides the fuel flow into multiple streams that are each supplied to a respective combustion can 17 in the combustion section 16. For example, the flow divider 138 may include an input line 140 fluidly coupled to the mixing unit 102 and a plurality of outlet lines 142 each fluidly coupled to a combustion can 17 of a plurality of combustion cans 17 in the combustion section 16 to supply fuel (e.g., a fuel mixture) to the combustion cans 17. In some embodiments, the accessory system 136 may include a recirculating line 143 and a pump 144. The recirculating line 143 may extend from an inlet disposed on the input line 140 downstream of the pump 144 to an outlet disposed on the input line 140 upstream of the pump 144. Further, the accessory system may include one or more valves 145 (e.g., a first valve disposed on the input line 140 upstream of the pump 144 and a second valve disposed on the recirculating line 143). In many embodiments, the accessory system 136 may further include a filter 141 disposed on the input line 140 for filtering contaminants from the fuel mixture.

In some embodiments, as shown in FIG. 2, the mixing unit 102 may be disposed upstream of the accessory system 136, such that a liquid fuel mixture is provided to the accessory system 136. In other embodiments, as shown in FIG. 3, the mixing unit 102 may be disposed immediately upstream of the valve 145 (and downstream of the fuel selection unit 150), such that two or more liquid fuels may be mixed together (or emulsified) immediately prior to entrance into the pump 144.

As shown in FIG. 2, the liquid fuel system 100 may further include a water supply system 130 in selective fluid communication with the mixing unit 102 and in fluid communication with a water manifold 134 (in some embodiments). For example, the water supply system 130 may be disposed on a water supply line 132 fluidly extending between the water supply system 130, the mixing unit 102, and (in some embodiments) a water manifold 134 disposed in or adjacent to the combustion section 16. In some embodiments, a three-way valve 135 may be disposed on the water supply line 132 and in operable communication with the controller 106, such that the controller 106 can actuate the three-way valve 135 to control when the mixing unit 102 receives water (and/or control the amount of water received by the mixing unit 102).

In many embodiments, the water supply system 130 may include a water tank 146 and a water skid 148. The water tank 146 may be a container, vessel, or other source of water. The water skid 148 includes one or more pumps 101 and one or more valves 103. Each of the one or more pumps 101 may be configured to selectively switch between an operational mode (where the pump 101 is moving fluid) and a non-operational mode (where the pump 101 is not moving fluid). The one or more valves 103 may be actuated between an open position (where fluid is permitted to pass therethrough) and a closed position (where fluid is blocked or otherwise prevented from passing therethrough). The controller 106 may be in operable communication with the water skid 148 (and/or the entire water supply system 130), such that the controller 106 can selectively provide water from the water tank 146 to the mixing unit 102 by actuating the one or more valves 103 and/or by operating the one or more pumps 101.

As shown, the water manifold 134 may supply a flow of water to each combustion can 17 of the plurality of combustion cans 17 in the combustion section 16. In many embodiments, the water supply system 130 may be communicatively coupled to the controller 106. For example, the controller 106 may be able to selectively provide water from the water supply system to the mixing unit 102 and/or the water manifold 134 (e.g., by controlling the position of the one or more valves 103 and/or 3-way valve 135 and/or the operation of the one or more pumps 101). In many implementations, the controller 106 may perform one or more operations causing the liquid fuel system 100 to provide water from the water supply system 130 (e.g., by supplying water from the water tank 146) to the mixing unit 102 while providing the two or more liquid fuels 109, 111 from the plurality of liquid fuel supply systems 104 to the mixing unit 102.

As shown in FIG. 3, in some embodiments, the liquid fuel system 100 may include a liquid fuel selection unit 150 fluidly coupled to the first liquid fuel supply system 108 and the second liquid fuel supply system 110. The liquid fuel selection unit 150 may be a three-way valve, manifold, or other fluid selecting means that receives multiple liquid fuels from the plurality of liquid fuel supply systems 104 as an input and that selects a singular liquid fuel to provide to the accessory system 136 as an output. For example, the liquid fuel selection unit 150 may be operatively coupled to the controller 106, such that the controller may select which liquid fuel to provide as an output to the accessory system 136 and/or the combustion section 16. In such embodiments, as shown, the mixing unit 102 may be disposed downstream of the liquid fuel selection unit 150 (such as immediately downstream and fluidly coupled to the liquid fuel selection unit 150).

As shown in FIG. 3, the liquid fuel system 100 may further include an aqueous ammonia supply system 152 in selective fluid communication with the mixing unit 102. In some embodiments, the aqueous ammonia supply system 152 may be considered as another liquid fuel supply system 104 of the plurality of liquid fuel supply systems 104. By way of example, the aqueous ammonia supply system 152 may be disposed on an aqueous ammonia supply line 151 fluidly extending between an aqueous ammonia tank 154 and the mixing unit 102. In many embodiments, the aqueous ammonia supply system 152 may include the aqueous ammonia tank 154 and an aqueous ammonia skid 156. The aqueous ammonia tank 154 may be a container, vessel, or other source of aqueous ammonia. The aqueous ammonia skid 156 may include one or more pumps 101 and one or more valves 103. Each of the one or more pumps 101 may be configured to selectively switch between an operational mode (where the pump 101 is moving fluid) and a non-operational mode (where the pump 101 is not moving fluid). The one or more valves 103 may be actuated between an open position (where fluid is permitted to pass therethrough) and a closed position (where fluid is blocked or otherwise prevented from passing therethrough).

The controller 106 may be in operable communication with the aqueous ammonia skid 156 (and/or the entire aqueous ammonia supply system 152), such that the controller 106 can selectively provide aqueous ammonia from the aqueous ammonia tank 154 to the mixing unit 102 by actuating the one or more valves 103 and/or by operating the one or more pumps 101. In exemplary embodiments, the controller 106 may be configured to cause the liquid fuel system 100 to perform various operations including selecting a liquid fuel with the liquid fuel selection unit 150 disposed upstream of the mixing unit 102. In many embodiments, the operations may further include providing the liquid fuel that was selected by the liquid fuel selection unit 150 to the mixing unit 102. In various embodiments, the operations may further include providing aqueous ammonia from an aqueous ammonia supply system 152 to the mixing unit 102. The operations may further include mixing, with the mixing unit 102, the liquid fuel that was selected and the aqueous ammonia to create the liquid fuel mixture. In some implementations, the operations may further include providing the liquid fuel mixture to a combustion section 16 (e.g., to the plurality of combustion cans 17 in the combustion section 16), via the accessory system 136 as discussed above.

As shown in FIGS. 2 and 3, the controller 106 is shown as a block diagram to illustrate the suitable components that may be included within the controller 106. As shown, the controller 106 may include one or more processor(s) 114 and associated memory device(s) 116 configured to perform a variety of computer-implemented functions (e.g., performing the methods, steps, calculations and the like and storing relevant data as disclosed herein). Additionally, the controller 106 may also include a communications module 118 to facilitate communications between the controller 106 and the various components of the system 100. For example, the communications module 118 may be in communication with the plurality of liquid fuel supply systems 104, the water supply system 130, the accessory system 136, and/or the aqueous ammonia supply system 152.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 106 to perform various functions and/or operations.

The liquid fuel systems 100 shown and described above with reference to FIGS. 2 and 3 advantageously provide for increased fuel flexibility by allowing the combustion section 16 to operate on two or more fuels (e.g., a fuel mixture) via the mixing unit 102 (as opposed to a singular fuel). Additionally, the present liquid fuel systems 100 allow for more robust control of the fuel properties (such as the viscosity, vanadium content, density, Modified Wobbe Index, etc.) by controlling the mixture ratios and/or heating of the fuel. Additionally, the present liquid fuel systems 100 advantageously enable water emulsification with fuel before injection into combustion section 16 (e.g., via the mixing unit 102). Further, the present liquid fuel systems 100 may enable using aqueous ammonia as fuel for the combustion section 16 by mixing/emulsifying the aqueous ammonia with other fuels (e.g., via the mixing unit 102) to increase flame stability and to reduce NOx in the combustion section 16.

Figure 4:
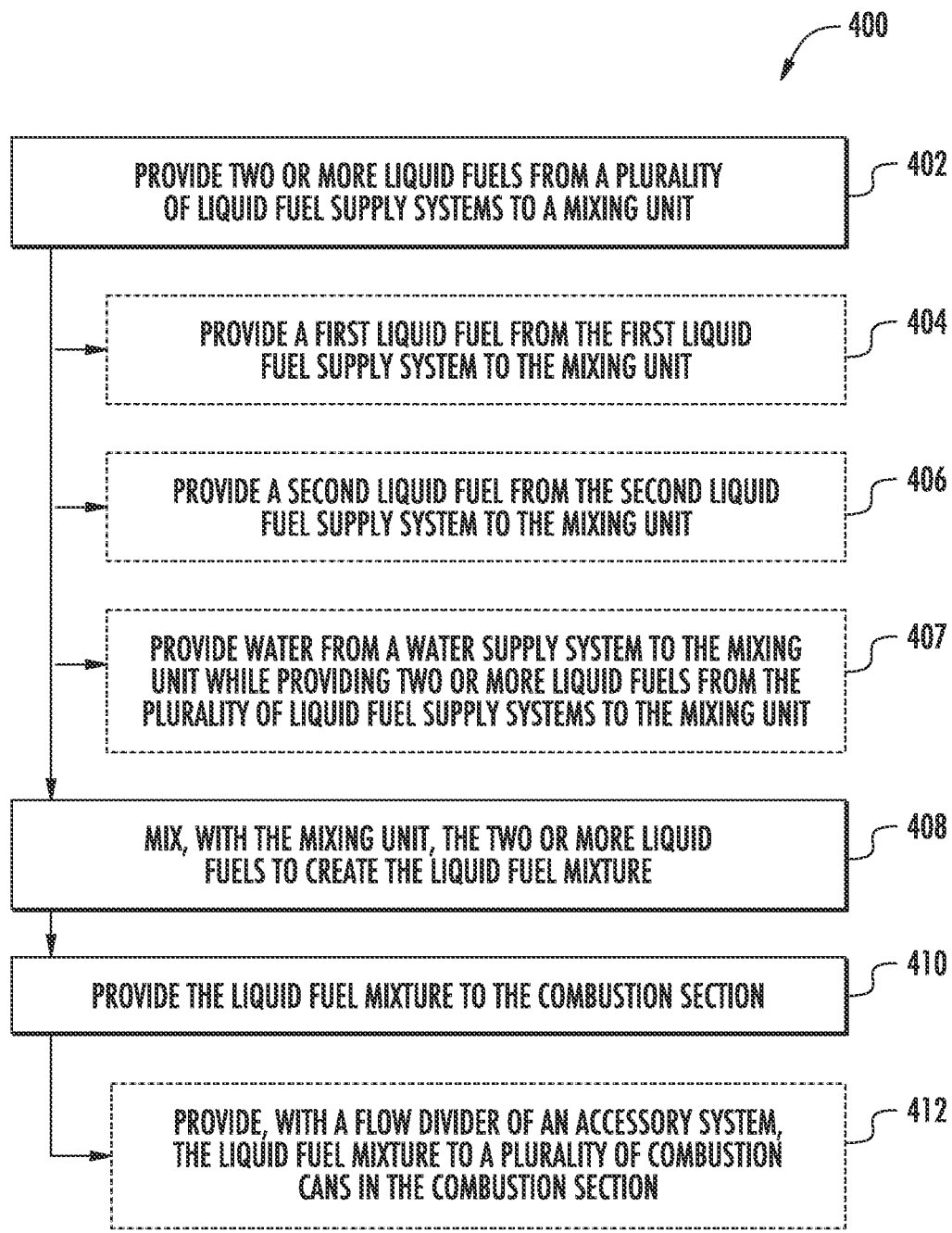
FIG. 4 illustrates a flow chart of a method of supplying a liquid fuel mixture to a combustion section of a turbomachine in accordance with embodiments of the present disclosure.

Referring now to FIG. 4, a flow diagram of one embodiment of a method 400 of supplying a liquid fuel mixture to a combustion section 16 is illustrated in accordance with aspects of the present subject matter. In general, the method 400 will be described herein with reference to the gas turbine 10 and the liquid fuel systems 100 described above with reference to FIGS. 1 through 3. However, it will be appreciated by those of ordinary skill in the art that the disclosed method 400 may generally be utilized with any suitable turbomachine and/or may be utilized in connection with a liquid fuel system having any other suitable system configuration. In addition, although FIG. 4 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, the method 400 may include a step 402 (such as an initial step in some embodiments) of providing two or more liquid fuels from a plurality of liquid fuel supply systems 104 to a mixing unit 102. For example, providing at step 402 may further include a step 404 of providing a first liquid fuel from the first liquid fuel supply system 108 to the mixing unit 102 and a step 406 of providing a second liquid fuel from the second liquid fuel supply system 110 to the mixing unit 102. The first liquid fuel and the second liquid fuel may be different from one another, such that the mixing unit 102 may receive two or more different fuels as an input. In some embodiments, one of the first liquid fuel and the second liquid fuel is aqueous ammonia (e.g., from aqueous ammonia tank 154).

In certain implementations, the method 400 may further include an optional step 407 of providing water from a water supply system 130 to the mixing unit 102 while providing two or more liquid fuels from the plurality of liquid fuel supply systems 104 to the mixing unit 102. For example, the water from the water supply system 130 may be selectively supplied to the mixing unit 102 and/or to the water manifold 134, e.g., by actuating the three-way valve 135, actuating the one or more valves 103 of the water skid 148, or operating the one or more pumps 101 of the water skid 148.

In many implementations, the method 400 may further include a step 408 of mixing, with the mixing unit 102, the two or more liquid fuels to create the liquid fuel mixture. For example, the mixing unit may receive two or more liquid fuels from the plurality of liquid fuel supply systems 104, mix (e.g., emulsify, agitate, or otherwise provide a uniform mixture) the two or more liquid fuels, and output a fuel mixture to the combustion section 16.

When the mixing unit 102 is provided with water in addition to the two or more liquid fuels from the plurality of liquid fuel supply systems 104, the mixing unit 102 may generate an emulsification mixture of water and fuel (such as a mixture containing two or more fuels and water). When the mixing unit is not provided with water (e.g., the three-way valve 135 is either closed or only providing water to the water manifold 134), then the mixing unit 102 may receive two or more liquid fuels from the plurality of liquid fuel supply systems 104 and provide a liquid fuel mixture (not containing water) to the combustion section 16. In this way, the combustion section 16 may be selectively provided with either a liquid fuel mixture or an emulsified liquid fuel mixture containing water (e.g., by actuating the three-way valve 135).

Particularly, in various implementations, the method 400 may further include a step 410 of providing the liquid fuel mixture (or emulsion) to the combustion section 16. For example, the liquid fuel mixture from the mixing unit 102 may be provided to a flow divider 138 of an accessory system 136, where the liquid fuel mixture may be divided into multiple separate streams each provided to a respective combustion can 17 of the plurality of combustion cans 17 in the combustion section 16. In such embodiments, the method may include an optional step 412 of providing, with the flow divider 138 of the accessory system 136, the liquid fuel mixture to a plurality of combustion cans 17 in the combustion section 16. For example, the flow divider 138 may include an input line 140 fluidly coupled to the mixing unit 102 and a plurality of outlet lines 142 each fluidly coupled to a combustion can 17 of a plurality of combustion cans 17 in the combustion section 16 to supply the fuel mixture (or emulsion) to the combustion cans 17.

In many embodiments, the method 400 may include heating a fuel of the two or more fuels with a fuel heat exchanger. For example, the fuel heat exchanger may heat one or more of the one or more fuels prior to entrance into the mixing unit 102. Particularly, the first fuel supply system 108 may include a first fuel heat exchanger 123, and the second fuel supply system 110 may include a second fuel heat exchanger 125. Both the first fuel heat exchanger 123 and the second fuel heat exchanger 125 may be disposed upstream of the mixing unit 102, such that each fuel of the one or more fuels may be separately heated prior to entrance into the mixing unit 102, thereby advantageously increasing the operational flexibility of the combustion section 16.

In many implementations, the method 400 may further include selecting a liquid fuel with a liquid fuel selection unit 150 disposed upstream of the mixing unit 102. The liquid fuel selection unit 150 may be in fluid communication with the plurality of liquid fuel supply systems 104. For example, the liquid fuel selection unit 150 may receive multiple liquid fuels from the plurality of liquid fuel supply systems 104 and provide a singular liquid fuel as an output. In such embodiments, mixing unit 102 may be disposed in fluid communication on the accessory system 136, and the method 400 may further include providing the liquid fuel from the liquid fuel selection unit 150 to the mixing unit 102. The method 400 may further include providing aqueous ammonia from an aqueous ammonia supply system 152 to the mixing unit 102. The aqueous ammonia may be selectively provided to the mixing unit at least partially based on emissions requirements, power output requirements, or other operational requirements of the combustion section 16. In many implementations, the method 400 may further include mixing, with the mixing unit, the liquid fuel and the aqueous ammonia to create the liquid fuel mixture and providing the liquid fuel mixture to a combustion section 16.

The method 400 described above with reference to FIG. 4 advantageously provides for increased fuel flexibility by allowing the combustion section 16 to operate on one or more fuels (or a fuel mixture) via the mixing unit 102 (as opposed to a singular fuel). Additionally, the liquid fuel system 100 allows for more robust control of the fuel properties (such as the viscosity, vanadium content, density, etc.) by controlling the mixture ratios and/or heating of the fuel. Additionally, the method 400 advantageously enables liquid fuel emulsification with water (and/or aqueous ammonia) before injection into combustion section 16 (e.g., via the mixing unit 102). Further, the liquid fuel systems 100 may enable using aqueous ammonia as fuel for the combustion section 16 by mixing/emulsifying the aqueous ammonia with other fuels (e.g., via the mixing unit 102) to increase flame stability and reduce NOx in the combustion section 16.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A liquid fuel system for a turbomachine, the liquid fuel system comprising: a mixing unit; a plurality of liquid fuel supply systems, each liquid fuel supply system fluidly coupled to the mixing unit; and a controller communicatively coupled to the mixing unit and the plurality of liquid fuel supply systems, the controller comprising memory and one or more processors, the memory storing instructions that when executed by the one or more processors cause the liquid fuel system to perform operations including: providing two or more liquid fuels from the plurality of liquid fuel supply systems to the mixing unit; mixing, with the mixing unit, the two or more liquid fuels to create a liquid fuel mixture; and providing the liquid fuel mixture to a combustion section of the turbomachine.

The liquid fuel system as in any of the preceding clauses, further comprising a water supply system in selective fluid communication with the mixing unit.

The liquid fuel system as in any of the preceding clauses, wherein the water supply system is communicatively coupled to the controller, and wherein the operations further include: providing water from the water supply system to the mixing unit while providing the two or more liquid fuels from the plurality of liquid fuel supply systems to the mixing unit.

The liquid fuel system as in any of the preceding clauses, wherein each liquid fuel supply system of the plurality of liquid fuel supply systems comprises a liquid fuel tank and a liquid fuel forwarding skid.

The liquid fuel system as in any of the preceding clauses, wherein one or more liquid fuel supply systems of the plurality of liquid fuel supply systems comprises a fuel heat exchanger upstream of the mixing unit.

The liquid fuel system as in any of the preceding clauses, further comprising an accessory system having a flow divider, wherein the flow divider includes an input line fluidly coupled to the mixing unit and a plurality of outlet lines each fluidly coupled to a combustion can of a plurality of combustion cans in the combustion section.

The liquid fuel system as in any of the preceding clauses, further comprising a water supply system and a water manifold, the water supply system in selective fluid communication with the mixing unit and in fluid communication with the manifold, the water manifold in fluid communication with each combustion can of the plurality of combustion cans.

The liquid fuel system as in any of the preceding clauses, wherein the two or more liquid fuels comprise a first liquid fuel from a first liquid fuel supply system of the plurality of liquid fuel supply systems and a second liquid fuel from a second liquid fuel supply system of the plurality of liquid fuel supply systems, the second liquid fuel being different from the first liquid fuel.

The liquid fuel system as in any of the preceding clauses, wherein the first liquid fuel comprises one of a light diesel oil, a heavy fuel oil, a crude oil, liquefied natural gas, or an aqueous ammonia, and wherein the second liquid fuel comprises another of the light diesel oil, the heavy fuel oil, the crude oil, liquefied natural gas, or the aqueous ammonia.

A liquid fuel system for a turbomachine, the liquid fuel system comprising: a mixing unit; a fuel selection unit disposed upstream of the mixing unit; a plurality of liquid fuel supply systems, each liquid fuel supply system fluidly coupled to fuel selection unit; an aqueous ammonia supply system fluidly coupled to the mixing unit; and a controller communicatively coupled to the fuel selection unit, the mixing unit, and the plurality of liquid fuel supply systems, the controller comprising memory and one or more processors, the memory storing instructions that when executed by the one or more processors cause the liquid fuel system to perform operations including: providing two or more liquid fuels from the plurality of liquid fuel supply systems to the fuel selection unit; selecting, within the fuel selection unit, a liquid fuel from the two or more liquid fuels; providing the selected liquid fuel to the mixing unit; providing aqueous ammonia from the aqueous ammonia supply system to the mixing unit; mixing, with the mixing unit, the selected liquid fuel and the aqueous ammonia to create the liquid fuel mixture; and providing the liquid fuel mixture to a combustion section of the turbomachine.

A method of supplying a liquid fuel mixture to a combustion section of a turbomachine, the method comprising: providing two or more liquid fuels from a plurality of liquid fuel supply systems to a mixing unit; mixing, with the mixing unit, the two or more liquid fuels to create the liquid fuel mixture; and providing the liquid fuel mixture to the combustion section.

The method as in any of the preceding clauses, further comprising providing water from a water supply system to the mixing unit while providing the two or more liquid fuels from the plurality of liquid fuel supply systems to the mixing unit.

The method as in any of the preceding clauses, further comprising, for each liquid fuel supply system of the plurality of liquid fuel supply systems, directing a respective liquid fuel from a liquid fuel tank to a liquid fuel forwarding skid.

The method as in any of the preceding clauses, wherein one or more liquid fuel supply systems of the plurality of liquid fuel supply systems comprises a fuel heat exchanger.

The method as in any of the preceding clauses, further comprising heating a fuel of the one or more liquid fuels with the fuel heat exchanger.

The method as in any of the preceding clauses, further comprising providing, with a flow divider of an accessory system, the liquid fuel mixture to a plurality of combustion cans in the combustion section.

The method as in any of the preceding clauses, further comprising selectively providing water from a water supply system to the mixing unit.

The method as in any of the preceding clauses, wherein providing the two or more liquid fuels to the mixing unit further comprises: providing a first liquid fuel from a first liquid fuel supply system of the plurality of liquid fuel supply systems; and providing a second liquid fuel from a second liquid fuel supply system of the plurality of liquid fuel supply systems, the second liquid fuel being different from the first liquid fuel.

The method as in any of the preceding clauses, wherein the first liquid fuel comprises one of a light diesel oil, a heavy fuel oil, a crude oil, liquefied natural gas, or an aqueous ammonia, and wherein the second liquid fuel comprises another of the light diesel oil, the heavy fuel oil, the crude oil, liquefied natural gas, or the aqueous ammonia.

What is claimed is:

1. A liquid fuel system for a turbomachine, the liquid fuel system comprising:
    an accessory system having a flow divider, wherein the flow divider includes an input line and a plurality of outlet lines each fluidly coupled to a combustion can of a plurality of combustion cans in a combustion section;
    a mixing unit disposed upstream of the flow divider and in fluid communication with the input line;
    a plurality of liquid fuel supply systems, each liquid fuel supply system fluidly coupled to the mixing unit; and
    a controller communicatively coupled to the mixing unit and the plurality of liquid fuel supply systems, the controller comprising memory and one or more processors, the memory storing instructions that when executed by the one or more processors cause the liquid fuel system to perform operations including:
        providing two or more liquid fuels from the plurality of liquid fuel supply systems to the mixing unit, wherein the two or more liquid fuels comprise a first liquid fuel from a first liquid fuel supply system of the plurality of liquid fuel supply systems and a second liquid fuel from a second liquid fuel supply system of the plurality of liquid fuel supply systems, the second liquid fuel having a different chemical composition than the first liquid fuel;
        mixing, with the mixing unit, the two or more liquid fuels to create a liquid fuel mixture; and
        providing the liquid fuel mixture to each combustion can of the plurality of combustion cans in the combustion section of the turbomachine.

2. The liquid fuel system as in claim 1, further comprising a water supply system in selective fluid communication with the mixing unit.

3. The liquid fuel system as in claim 2, wherein the water supply system is communicatively coupled to the controller, and wherein the operations further include:
    providing water from the water supply system to the mixing unit while providing the two or more liquid fuels from the plurality of liquid fuel supply systems to the mixing unit.

4. The liquid fuel system as in claim 1, wherein each liquid fuel supply system of the plurality of liquid fuel supply systems comprises a liquid fuel tank and a liquid fuel forwarding skid.

5. The liquid fuel system as in claim 1, wherein each of the plurality of liquid fuel supply systems comprises a fuel heat exchanger immediately upstream of the mixing unit.

6. The liquid fuel system as in claim 1, further comprising a water supply system and a water manifold, the water supply system in selective fluid communication with the mixing unit and in fluid communication with the manifold, the water manifold in fluid communication with each combustion can of the plurality of combustion cans.

7. The liquid fuel system as in claim 1, wherein the first liquid fuel comprises one of a light diesel oil, a heavy fuel oil, a crude oil, liquefied natural gas, or an aqueous ammonia, and wherein the second liquid fuel comprises another of the light diesel oil, the heavy fuel oil, the crude oil, liquefied natural gas, or the aqueous ammonia.

8. The liquid fuel system as in claim 1, wherein the accessory system further includes a recirculating line, a pump, a filter, and a valve positioned on the input line.

9. A liquid fuel system for a turbomachine, the liquid fuel system comprising:
    an accessory system having a flow divider, wherein the flow divider includes an input line and a plurality of outlet lines each fluidly coupled to a combustion can of a plurality of combustion cans in a combustion section;
    a mixing unit disposed upstream of the flow divider and in fluid communication with the input line;
    a fuel selection unit disposed upstream of the mixing unit;
    a plurality of liquid fuel supply systems, each liquid fuel supply system fluidly coupled to fuel selection unit;

an aqueous ammonia supply system fluidly coupled to the mixing unit; and a controller communicatively coupled to the fuel selection unit, the mixing unit, and the plurality of liquid fuel supply systems, the controller comprising memory and one or more processors, the memory storing instructions that when executed by the one or more processors cause the liquid fuel system to perform operations including:

providing two or more liquid fuels from the plurality of liquid fuel supply systems to the fuel selection unit, wherein the two or more liquid fuels comprise a first liquid fuel from a first liquid fuel supply system of the plurality of liquid fuel supply systems and a second liquid fuel from a second liquid fuel supply system of the plurality of liquid fuel supply systems, the second liquid fuel having a different chemical composition than the first liquid fuel;

selecting, within the fuel selection unit, a liquid fuel from the two or more liquid fuels;

providing the selected liquid fuel to the mixing unit;

providing aqueous ammonia from the aqueous ammonia supply system to the mixing unit;

mixing, with the mixing unit, the selected liquid fuel and the aqueous ammonia to create the liquid fuel mixture; and providing the liquid fuel mixture to each combustion can of the plurality of combustion cans in the combustion section of the turbomachine.

10. The liquid fuel system as in claim 9, wherein each of the plurality of liquid fuel supply systems comprises a fuel heat exchanger immediately upstream of the fuel selection unit.

11. A method of supplying a liquid fuel mixture to a combustion section of a turbomachine, the method comprising:

providing two or more liquid fuels from a plurality of liquid fuel supply systems to a mixing unit, wherein providing the two or more liquid fuels to the mixing unit comprises:

providing a first liquid fuel from a first liquid fuel supply system of the plurality of liquid fuel supply systems, and providing a second liquid fuel from a second liquid fuel supply system of the plurality of liquid fuel supply systems, the second liquid fuel having a different chemical composition than the first liquid fuel;

mixing, with the mixing unit, the two or more liquid fuels to create the liquid fuel mixture; and providing the liquid fuel mixture to an accessory system having a flow divider, wherein the flow divider includes an input line and a plurality of outlet lines each fluidly coupled to a combustion can of a plurality of combustion cans in the combustion section.

12. The method as in claim 11, further comprising providing water from a water supply system to the mixing unit while providing the two or more liquid fuels from the plurality of liquid fuel supply systems to the mixing unit.

13. The method as in claim 11, further comprising, for each liquid fuel supply system of the plurality of liquid fuel supply systems, directing a respective liquid fuel from a liquid fuel tank to a liquid fuel forwarding skid.

14. The method as in claim 13, wherein one or more liquid fuel supply systems of the plurality of liquid fuel supply systems comprises a fuel heat exchanger.

15. The method as in claim 14, further comprising heating a fuel of the one or more liquid fuels with the fuel heat exchanger.

16. The method as in claim 11, further comprising selectively providing water from a water supply system to the mixing unit.

17. The method as in claim 11, wherein the first liquid fuel comprises one of a light diesel oil, a heavy fuel oil, a crude oil, liquefied natural gas, or an aqueous ammonia, and wherein the second liquid fuel comprises another of the light diesel oil, the heavy fuel oil, the crude oil, liquefied natural gas, or the aqueous ammonia.

* * * * *